US012026642B2

(12) United States Patent
Wong et al.

(10) Patent No.: US 12,026,642 B2
(45) Date of Patent: Jul. 2, 2024

(54) CONTENT COLLABORATION PLATFORM WITH AN INTEGRATED TRIP COORDINATION SERVICE AND INTERFACE

(71) Applicants: Atlassian Pty Ltd., Sydney (AU); Atlassian US, Inc., San Francisco, CA (US)

(72) Inventors: Alan Wong, Cedar Park, TX (US); Alizeh Rehman, Dublin, CA (US); David Herbst, Aurora, CO (US); Emily Crowe, Denver, CO (US); Timothy Granshaw, Breckenridge, CO (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/955,498

(22) Filed: Sep. 28, 2022

(65) Prior Publication Data
US 2024/0104440 A1    Mar. 28, 2024

(51) Int. Cl.
*G06Q 10/02* (2012.01)
*G06Q 50/40* (2024.01)
(52) U.S. Cl.
CPC .............. *G06Q 10/02* (2013.01); *G06Q 50/40* (2024.01)
(58) Field of Classification Search
CPC ................................ G06Q 10/02; G06Q 50/30

USPC ............................................................ 705/5
See application file for complete search history.

(56) References Cited

U.S. PATENT DOCUMENTS 11,164,269 B1 * 11/2021 Locke ................... H04W 4/024
2021/0049714 A1 * 2/2021 Shaaban ............ G06Q 10/1093

OTHER PUBLICATIONS

"Recommending a sequence of interesting places for tourist trips" Published by Springer link (Year: 2017).*

* cited by examiner

*Primary Examiner* — Zeina Elchanti
(74) *Attorney, Agent, or Firm* — Brownstein Hyatt Farber Schreck, LLP

(57) ABSTRACT

A trip-planning operation includes identifying a primary work location associated with each user account of a dependency graph defined by the three or more users performing a set of interaction events on a software platform. A first set of advanced programming interface (API) calls is generated to a third party service to obtain one or more query results based on the primary work location, which are then analyzed to determine a ranked list of candidate trip locations based on a ranking criterion. At least a portion of the ranked list is displayed on the client device and, in response to an input from the client device and upon a determination that a consensus regarding the candidate trip location exists among the three or more user accounts, a second API call is generated to the third party service to book a trip to the candidate trip location for each user account.

20 Claims, 9 Drawing Sheets

INTEGRATED TRAVEL SERVICES

FIND THE BEST PLACE FOR YOUR TEAM TO MEET.

*INTEGRATED TRAVEL SERVICES MAKES OFFSITE PLANNING EASY BY FINDING THE MOST AFFORDABLE LOCATION FOR YOUR NEXT TEAM TRIP. SIMPLY INPUT WHERE TEAM MEMBERS ARE TRAVELLING FROM, YOUR PREFERRED DATES AND WE'LL TELL YOU WHAT WORKS BEST FOR YOUR BUDGET.*

1. Make sure your team travel details look good

| TEAM MEMBER 1 | TEAM MEMBER 4 |
| John Smith, DEN | Tim North, ATX |

| TEAM MEMBER 2 | TEAM MEMBER 5 |
| Bob Jones, DEN | Susan Young, SAN |

TEAM MEMBER 3
Jane Doe, SFO

2. Choose the start date for your trip
    Q JULY 11, 2022

3. Choose the end date for your trip
    Q JULY 16, 2022

PLAN MY TRIP

RESULTS

Chicago: $1234
Your team can fly and stay in Chicago from July 11-15, 2022 for $1234.

TRIP BOOKED
[OK] [UNDO] [CHANGE]

Atlanta: $1345
TRIP BOOKED
Approval has been sent to your team's managers. You will be notified once all trip details are confirmed.
Okay • Undo

San Diego: $1456
Your team can fly and stay in San Diego from July 11-15, 2022 for $1456.
[BOOK]

HOME ▾  RECENT ▾  SPACES ▾  PEOPLE ▾  APPS ▾  CREATE  Q SEARCH

*FIG. 2*

| | | | | | | SHARE ▾ | EXPORT ISSUES ▾ | ADVANCED SEARCH | LIST VIEW ▾ | DETAIL VIEW ▾ | |
|---|---|---|---|---|---|---|---|---|---|---|---|

IT PLANNING
Service Project

← BACK TO PROJECT

PROJECTS / IT PLANNING

ISSUES

CREATE    🔍 SEARCH

*ISSUES AND FILTERS*

ALL ISSUES
MY OPEN ISSUES
REPORTED BY ME
OPEN ISSUES
DONE ISSUES
VIEWED RECENTLY
RESOLVED RECENTLY
UPDATED RECENTLY

VIEW ALL FILTERS

| SEARCH ISSUES 🔍 | PROJECT: IT PLANNING ▾ | TYPE ▾ | STATUS ▾ | ASSIGNEE ▾ | MORE+ | SAVE FILTER |
|---|---|---|---|---|---|---|

| TYPE | KEY | SUMMARY | ASSIGNEE | REPORTER | P | STATUS |
|---|---|---|---|---|---|---|
| ⊙ | ITPLAN-160 | TALENT ACQUISITION AUTOMATION | JOHN SMITH | STEVE LEE | » | SCORED FOR MAY |
| ⊙ | ITPLAN-159 | CORE FINANCIALS | BOB JONES | STEVE LEE | » | NEW |
| ⊙ | ITPLAN-158 | LONG-TERM | JOHN SMITH | STEVE LEE | » | NEW |
| ⊙ | ITPLAN-157 | REMOTE ACCESS | JOHN SMITH | STEVE LEE | » | NEW |
| ⊙ | ITPLAN-156 | TECH- EXTERNAL STAFF | JANE DOE | STEVE LEE | » | CANCELLED |
| ⊙ | ITPLAN-155 | SALES TECH - EXTERNAL STAFF | JOHN SMITH | STEVE LEE | » | CANCELLED |
| ⊙ | ITPLAN-154 | PORTAL MIGRATION | JANE DOE | STEVE LEE | » | NEW |
| ⊙ | ITPLAN-153 | ANALYTICS & REPORTING | TIM NORTH | STEVE LEE | » | SCORED FOR APRIL |
| ⊙ | ITPLAN-152 | TALENT & PERFORMANCE - JOBS | S. YOUNG | STEVE LEE | » | SCORED FOR MAY |
| ⊙ | ITPLAN-151 | TALENT & PERFORMANCE - CYCLE | JOHN SMITH | STEVE LEE | » | SCORED FOR MAY |
| ⊙ | ITPLAN-150 | RISK MANAGEMENT | JOHN SMITH | STEVE LEE | » | NEW |
| ⊙ | ITPLAN-149 | INTELLECTUAL PROPERTY | S. YOUNG | STEVE LEE | » | NEW |
| ⊙ | ITPLAN-148 | MODERNIZATION | TIM NORTH | STEVE LEE | » | NEW |
| ⊙ | ITPLAN-147 | DATA CORRECTIONS | JOHN SMITH | STEVE LEE | » | NEW |
| ⊙ | ITPLAN-146 | IT CAPABILITY & APPLICATIONS | S. YOUNG | STEVE LEE | « | NEW |
| ⊙ | ITPLAN-145 | IT PORTFOLIO | TIM NORTH | STEVE LEE | » | CANCELLED |

*WOULD YOU LIKE TO ACCEPT "TRIP ITINERARY" TO "MEETING LOCATION"?*

YES    NO

FIG. 5

CONTENT COLLABORATION PLATFORM WITH AN INTEGRATED TRIP COORDINATION SERVICE AND INTERFACE

TECHNICAL FIELD

Embodiments described herein relate to cloud-based software platforms and, in particular, to a trip coordination service and interface integrated within a cloud-based content collaboration platform.

BACKGROUND

Modern teams may use networked computer systems in order to collaborate on projects and perform work from a variety of locations that are often remote from each other. In particular, content collaboration platforms can be used to develop, test, and deploy products in a virtual development environment. However, many traditional collaboration platforms tend to focus on a core set of functions or operations, which may require a user to engage with multiple different platforms or systems in order to facilitate communication and work across a team. The systems and techniques described herein may be used to integrate one or more services within a content collaboration platform and utilize data collected from the platform to enhance functionality and efficiency of the integrated service.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

An embodiment described herein can take the form of a computer-implemented method for planning a cost-efficient trip for users of an issue tracking platform. The method starts by obtaining a first set of interaction events from an interaction event log of the issue tracking platform. The issue tracking platform is configured to track a plurality of issues according to an automated workflow, wherein each issue at least a portion of the plurality of issues identifies at least one user account. The method proceeds to analyze the first set of interaction events to define a dependency graph among three or more user accounts. The method then obtains a second set of interaction events with regard to the three or more user accounts and analyzes the second set of interaction events with respect to a first set of issues associated with the dependency graph to determine an aggregate activity level among the three or more user accounts. Subsequently, in accordance with the aggregate activity level satisfying an activity criteria, a trip-planning operation is initiated. The trip-planning operation includes identifying a primary work location associated with each user account of the dependency graph to define a set of primary work locations, and generating a first set of advanced programming interface (API) calls to a third party service to obtain one or more query results based on the set of primary work locations. The one or more query results are then analyzed to determine a ranked list of candidate trip locations based on a ranking criterion. At least a portion of the ranked list of candidate trip locations are then displayed on a client device associated with each user account. Finally, in response to an input from the client device regarding a candidate trip location for each user account, a second call is made to the third party service to book a flight associated with the candidate trip location.

Another embodiment described herein can take the form of a trip-planning system having a client device and a trip coordination service communicably coupled to the client device over a network. The client device executes an instance of an application associated with a user account on a cloud-based software platform. The trip coordination service includes a processor configured to initiate a trip-planning operation in response to an aggregate activity level of three or more user accounts satisfying an activity criteria on the application. The trip-planning operation includes identifying a primary work location associated with each user account of a dependency graph. The dependency graph is defined by the three or more users performing a set of interaction events on the application monitored from among a first set of interaction events obtained from an interaction event log of the cloud-based software platform. The trip-planning operation further includes generating a first set of advanced programming interface (API) calls to a third party service to obtain one or more query results based on the primary work location for each user account. The one or more query results are then analyzed to determine a ranked list of candidate trip locations based on a ranking criterion. At least a portion of the ranked list of candidate trip locations is displayed on the client device associated with each user account. Subsequently, in response to an input from the client device regarding a candidate trip location for each user account, the trip-planning operation determines whether a consensus regarding the candidate trip location exists among the three or more user accounts. Finally, in response to determining that a consensus regarding the candidate trip location exists among the three or more user accounts, a second API call is generated to the third party service to book a trip to the candidate trip location for each user account.

A yet another embodiment described herein can take the form of a computer-implemented method for planning a cost-efficient trip for users of a collaborative documentation platform. The method starts by obtaining a first set of interaction events from an interaction event log of the collaborative documentation platform. The collaborative documentation platform is configured to monitor a plurality of documents, wherein each document identifies at least one user account. The method proceeds to analyze the first set of interaction events to define a dependency graph among three or more user accounts. The method then obtains a second set of interaction events with regard to the three or more user accounts and analyzes the second set of interaction events with respect to a first set of documents associated with the dependency graph to determine an aggregate activity level among the three or more user accounts. Subsequently, in accordance with the aggregate activity level satisfying an activity criteria, a trip-planning operation is initiated. The trip-planning operation includes identifying a primary work location associated with each user account of the dependency graph to define a set of primary work locations, and generating a first set of advanced programming interface (API) calls to a third party service to obtain one or more query results based on the set of primary work locations. The one or more query results are then analyzed to determine a ranked list of candidate trip locations based on a ranking criterion. At least a portion of the ranked list of candidate trip locations are then displayed on a client device associated with each user account. Finally, in response to an input from the client device regarding a candidate trip location for each user account, a second call is made to the third party service to book a flight associated with the candidate trip location.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 2 depicts an example view of a graphical user interface of a trip coordination service, according to certain aspects of the present disclosure.

FIG. 5 depicts an example view of a frontend application of an issue tracking platform with a pop-up window generated by the trip coordination service, according to certain aspects of the present disclosure.

Figure 1:
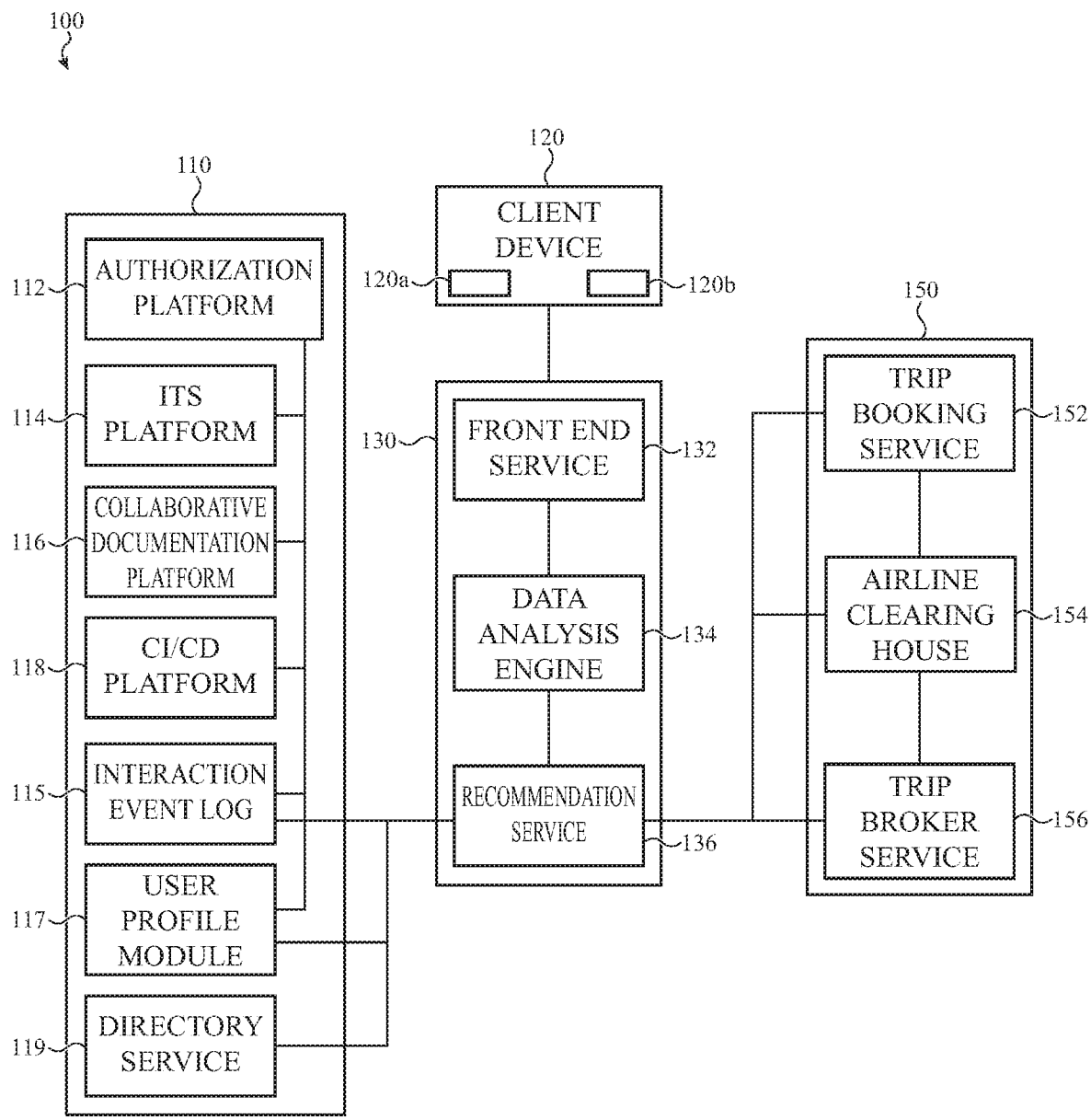
FIG. 1 depicts a simplified architecture diagram of a trip-planning system, according to certain aspects of the present disclosure.

The use of the same or similar reference numerals in different figures indicates similar, related, or identical items. The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively.

Additionally, directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. These words are intended to relate to the equivalent direction as depicted in a reference illustration; as understood contextually from the object(s) or element(s) being referenced, such as from a commonly used position for the object(s) or element(s); or as otherwise described herein. Further, it is noted that the term "signal" means a waveform (e.g., electrical, optical, magnetic, mechanical or electromagnetic) capable of traveling through a medium such as DC, AC, sinusoidal-wave, triangular-wave, square-wave, vibration, and the like.

Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

As used herein, the general term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

As workplace teams increasingly operate from remote locations, remotely located team members often feel an in-person meeting may be needed for effective collaboration and critical project work for the benefit of the organization. However, when deciding on when and how to conduct in-person meetings, it may be important to consider how the in-person meetings can be cost-effective and return a high return on investment through quick completion of critical project work. Furthermore, user event logs and other use history of a content collaboration platform may be leveraged in order to provide a more efficient and partially automated trip coordination service that can be used to coordinate and automatically book trips for in-person or co-located collaboration events.

Accordingly, the examples described here relate to a trip coordination service and interface that may be integrated within a content collaboration platform. The trip coordination service may leverage data from the content collaboration platform in order to coordinate trip arrangements and bookings that have been optimized with respect to trip time, trip cost, productivity, and connectivity with respect to individual team members. In particular, the proposed trip coordination service may utilize user event data or interaction event data to generate recommendations for high-value collaboration opportunities involving critical decision makers or influential team members.

Embodiments described herein relate to systems and methods for a trip coordination service and interface integrated within a cloud-based software platform, which in some implementations may include a content collaboration service or platform. In particular, the trip coordination service and interface may be integrated within one or more content collaboration platform on a host service. Example content collaboration platforms include, without limitation, an issue tracking platform, a collaborative documentation platform, a continuous integration and development platform, and the like.

The host service communicates with both a frontend application running on a client device associated with a user and a backend application configured to access data on user accounts and an interaction event log of the cloud-based software platform. The data generated by the system may be utilized to generate recommendations and bookings for a trip that enables in-person meetings of the users.

In one non-limiting example, the trip coordination service receives a history of interaction events associated with each of multiple users in a project team from an interaction event log of the cloud-based software platform. The interaction events may be opening, viewing, editing, closing, removing, messaging and/or drafting activity associated with a project on the cloud-based software platform. Based on the recorded interaction events, the trip coordination service may determine relationships among the multiple users by creating relationship-detection tools, for example, a dependency graph of any combination of three or more users potentially associated with the project. In some non-limiting examples, the dependency graph may be defined based on common permissions assigned to the three or more user accounts for managing content on the cloud-based software platform, interaction events with common platform objects, direct messages between user accounts, and other system activity. However, it should be noted that a dependency graph is only one example of a relationship-detection tool that is used for representing and detecting relationships among multiple users. Other techniques for storing and detecting pertinent information associated with multiple users may be implemented through use of statistical tools like correlation measures among data objects, as well as data registries, databases, modifications to existing data objects associated with user accounts. As a non-limiting example, information related to membership in a team may be stored as an attribute of a data object associated with a user account.

Upon determining that the dependency graph suggests that an identified group of three or more users interact regularly and/or repeatedly on the project, the trip coordination service may request and receive data related to interaction events—past, present, and/or future—related to the project within the identified group. Based on the received data on interaction events within the identified group crossing a threshold level of activity, the trip coordination service may predict a need for an in-person meeting among users in the identified group, and may initiate a trip-planning operation having a number of automated or semi-automated steps that lead to trip recommendations for the in-person meeting. Various factors such as, but not limited to, a current status of the project, a historical level of interaction among the users in the identified group, a known or demonstrable need and/or value of the in-person meeting, and calendar availability of the users in the identified group may be considered in making the prediction.

Subsequently, based on a location associated with each user in the group, the trip coordination service queries trip possibilities for the in-person meeting to a third party service and presents one or more optimal trip possibilities on the client device of each user by minimizing cost and time of flight, and maximizing time and value of the in-person meeting. In some embodiments, the location associated with each user may be obtained from the cloud-based software platform. As a non-limiting example, when the software platform is a content collaboration platform, the location may be stored as part of a directory or user profile associated with each user. The trip possibilities may include flight itineraries, train itineraries, vehicle itineraries, ship itineraries, hotel reservations, workspace reservations, and/or meal reservations.

In some non-limiting examples, the optimal trip possibilities may be generated by a recommendation algorithm based on historical in-person meetings of the identified group and/or trip preferences of each user in the identified group. Each user may be presented with the optimal trip possibilities and an option to select a trip by directing them to a graphical user interface of the trip coordination service, or alternatively by generating a pop-up window while they are working on the cloud-based software platform. As a non-limiting example, the trip possibilities may be presented on a graphical user interface of the trip coordination service integrated with the content collaboration platform using APIs or other integration techniques. The third party service provides the necessary brokering functionality during the queries and any trip-booking functionality once each user has selected a trip.

Advantageously, the systems and methods described herein can schedule cost-effective meetings with team members, enable high-value collaboration involving critical decision makers and/or influential team members, thereby returning a high return on investment through quick completion of critical project work.

FIG. 1 depicts a simplified architecture diagram of a trip-planning system 100. The trip-planning system 100 includes a host service 110, a client device 120, a trip coordination service 130, and a third party service 150 (e.g., Expedia, Booking.com, AirBnB, Yelp, Hotels.com, etc.). The host service 110 may be a virtual or physical computing resource (referred in many cases as a "cloud platform"). The host service 110 is communicably coupled to the client device 120, the trip coordination service 130, and the third party service 150 over a network such as, but not limited to, the open Internet. The host service 110 includes one or more hardware resources such as, but not limited to (or requiring) one or more of: a processor allocation; a memory allocation (also referred to as a working memory); non-volatile storage (also referred to as persistent memory); networking connections; and the like. The host service 110 includes an authorization platform 112, as well as software platforms—an issue tracking system (ITS) platform 114 (alternatively "issue tracking platform"), a collaborative documentation platform 116 (alternatively "documentation platform"), a continuous integration and development (CI/CD) platform 118, a directory service 119, among others. The host service 110 further includes interaction event log 115 and a user profile module 117.

The ITS platform 114 provides an issue tracking services for creating, managing, and tracking issues for software development, bug tracking, and/or information technology service management (ITSM) services. The collaborative documentation platform 116 includes a full-featured document editing and creation component configured to be rendered in a user's browser. The component may be defined at least in part by dynamic HTML, CSS, and JavaScript and may open one or more WebSockets to a backend of the collaborative documentation platform to provide real-time interactive features, such as a search feature or a URL prefetch/preview feature. The CI/CD platform 118 provides an interface for a code repository, a deployment management system, or other system or service used to track and manage versioned object storage. The directory service 119 provides a shared data infrastructure for locating, managing, administering and organizing everyday items and network resources on the host service 110.

One or more these software platforms can be used within an organization and leveraged to advance projects such that users can have a consistent and uniform experience in executing the goals of the projects. For example, for a single software development project, a software development team may use the ITS platform 114 to track assignment and progression of work, the collaborative documentation platform 116 to maintain documentation related to the project among users, and the CI/CD platform 118 to store project code, executables, and/or static assets.

A software platform, as described herein, can be configured to store one or more data objects in any form or format unique to that platform. Any data object of any platform may include one or more attributes and/or properties or individual data items that, in turn, include content inputted by a user and owned by an organization to which the user belongs. Examples of such content include personal data, private data, health information, personally-identifying information, business information, trade secret content, copyrighted content or information, restricted access information, research and development information, classified information, mutually-owned information (e.g., with a third party or government entity), or any other information and multimedia that is classified in some manner, according to some procedure, protocol, or jurisdiction-specific regulation. Such content can include personal data, private data, health information, personal-identifying information, business information, trade secret content, copyrighted content or information, restricted access information, research and development information, classified information, mutually-owned information (e.g., with a third party or government entity), or any other information, multimedia, or data. In many examples, although not required, organization-owned content may include information that is classified in some manner, according to some procedure, protocol, or jurisdiction-specific regulation.

A software platform, as described herein, may include a frontend and a backend configured to communicably couple over a computing network (which may include the open Internet) to exchange computer-readable structured data. Many software platforms described herein may be architected as software-as-a-service (SaaS) platforms configured to operate over the open Internet to render custom webpages within user browser windows, although it may be appreciated that this is merely one example construction and other embodiments can be implemented with native applications.

A frontend as described herein may be a first instance of software executing on the client device 120, such as a desktop computer, laptop computer, tablet computer, or handheld computer (e.g., mobile phone). The backend may be a second instance of software executing over a processor allocation and memory allocation of a virtual or physical computer architecture, such as the host service 110.

In many embodiments, the frontend and backend of a software platform as described herein are not collocated, and communicate over a large area and/or wide area network by leveraging one or more networking protocols, but this is not required of all implementations.

As noted above, a frontend of a software platform as described herein may be configured to render a graphical user interface at the client device 120 that instantiates frontend software. As a result of this architecture, the graphical user interface of the frontend can receive inputs from a user of the client device 120, which, in turn, can be formatted by the frontend into computer-readable structured data suitable for transmission to the backend for storage, transformation, and later retrieval.

One example architecture of the frontend includes a graphical user interface rendered in a browser executing on the client device 120. In other cases, a frontend may be a native application executing on the client device 120. Regardless of architecture, it may be appreciated that generally and broadly a frontend of a software platform as described herein is configured to render a graphical user interface to receive inputs from a user of the software platform and to provide outputs to the user of the software platform.

The software platform may be defined by a frontend application instantiated by the client device 120 and a backend application instantiated by the host service 110, whether virtual or physical. The backend application can be communicably coupled to the frontend application so as to receive inputs from and to provide information to a user of the frontend application. In addition, the backend application (and/or the frontend application) can be communicably coupled to a content store or shared data store, which may also be instantiated on the host service 110, whether virtual or physical. In this construction, the backend application and/or the frontend application can submit requests to and receive inputs from each end in order to create and display content of the page or document for display in the graphical user interface of the frontend application. In some cases, backend applications can be configured to transmit to the frontend application an executable file or script, such as a JavaScript™ file or script, that when executed by the frontend application causes it to be rendered in the graphical user interface of the frontend application, which can receive user input.

The backend application can be coupled to the frontend application (e.g., via WebSockets) in order to receive and parse user input to the document or page in real time or near real time. For example, as a user of the frontend application begins providing text input, the partial text input can be transmitted back to the backend application for analysis and/or other processing (e.g., spell checking, grammar checking, slash command syntax checking, and so on). In some cases, the frontend application and the backend application can cooperate to analyze user input. For example, the frontend application may be configured to monitor for a particular user input, after which the frontend application can communicate with the backend application to provide the corresponding functionality.

Referring back to FIG. 1, the authorization platform 112 provides a unified authentication service by verifying access from a permitted user and pairing the verified user with a corresponding user account in one or more of the software platforms. As one non-limiting example, the authorization platform 112 may use a shared cookie/scheme to authenticate each user account on each software platform. As another non-limiting example, the authorization platform 112 may authenticate users with a single sign-on service (SSO) and/or a two-factor authentication (2FA) service.

The interaction event log 115 monitors and updates any and all interaction events where a user interacts with one or more of the software platforms. The interaction events may be opening, viewing, editing, closing, removing, messaging, commenting, and/or drafting activity associated with an object of one or more of the software applications or system services. The interaction event log 115 can store and classify such interaction events based on user account, software platform, type of interaction event, time of interaction event, etc. Consequently, the interaction event log 115 can feed pertinent data regarding the interaction events to the trip coordination service 130 for analysis. Similarly, the user profile module 117 stores profile data for each user for matching with interaction events stored in the interaction event log 115 and for authenticating each user on the authorization platform 112.

The trip coordination service 130 includes a frontend service 132, a data analysis engine 134, and a recommendation service 136. The recommendation service 136 is communicably connected to receive data from the interaction event log 115 and the user profile module 117. The recommendation service 136 processes the received data as well as the input from the frontend service 132 using the data analysis engine 134 to generate API calls to the third party service 150, for generating trip possibilities as query results and booking trips to enable the in-person meetings. In some non-limiting examples, the recommendation service 136 may use a recommendation algorithm based on machine learning. Such a recommendation algorithm may be based on historical trips (e.g., flights, trains, vehicles, ships, hotels, meals, workspace, etc.) and preferences associated with each user account. Any commonly known recommendation algorithm thus customized may be used for this purpose.

The frontend service 132 communicates with the client device 120 to display the recommendations for the trip possibilities to a user on a graphical user interface (not shown) of the client device 120. The frontend service 132 also facilities processing of any user input regarding the recommendations such as, but not limited to, an indication of preferred trip dates.

The data analysis engine 134 receives data from the interaction event log 115 and the user profile module 117 of the host service 110. The data analysis engine 134 is configured to analyze the data to detect relationships between user accounts such as, by a dependency graph to identify a group of three or more users of the software platforms. The data analysis engine 134 also analyzes activity data of the identified group to determine an aggregate activity level within the group and if the aggregate activity level satisfies an activity criteria, to initiate the trip-planning operation. As defined herein, aggregate activity level relates to the entire set of interaction events among users within the identified group with respect to a project or a task. As defined herein, the activity criteria may be associated with a current project status, a historical level of interaction among the three or more users in the identified group, a demonstrable need for interaction among the three or more users, and/or a calendar availability associated with the three or more users.

Further, the data analysis engine 134 analyzes trip possibilities generated from the third party service 150 to determine a ranked list of candidate trip locations based on a ranking criterion. The ranking criterion may be related to minimizing cost of the trip, minimizing cost of a component of the trip such as a flight or hotel reservations, minimizing time of the trip, minimizing a number of layovers of the trip, minimizing layover time of the trip, and/or maximizing time at the candidate trip location. Accordingly, a trip location is selected for booking. The ranked list of candidate trip locations and the selected trip location may be determined by optimizing, individually or in combination, one or more factors of the ranking criterion. In some embodiments, such optimization for determined the ranked list includes performing multiple queries for each user account, and defining groups of candidate locations that satisfy the ranking criterion. The results may be sorted and groups of candidate locations may be defined based on candidate locations that satisfy ranking criterion when combined with the other user account based queries. In some implementations, the optimization may involve cross-referencing and sorting all the query results based on the ranking criterion, finding query results for a predefined set of trip locations, and/or finding query results based on the ranking criterion with respect to each individual user before matching against trip preferences of other users in the same team or project. In one implementation, the system may perform a set of queries for each user account, rank each list according to the criteria or trip preference and then cross-reference with other sets of queries for other user accounts in order to determine the ranked list.

The data analysis engine 134 may determine, based on user input, whether consensus exists on a selected trip location for each user such that the recommendation platform 136 can make API calls to the third party service 150 to book the trip for each user. Once the trip is booked, the data analysis engine 134 resets the aggregate activity level to include data about the upcoming trip.

The host service 110 is configured to provide one or more software components as a service to the client device 120 that is configured to operate a frontend application instance of software associated with a user account on any one or more of the ITS platform 114, the collaborative documentation platform 116, and the CI/CD platform 118. The frontend application instance on the client device 120 may be instantiated by cooperation of a processor 120a and a memory 120b in the client device 120. In particular, as with other embodiments described herein, the processor 120a may be configured to access the memory 120b to load an executable asset from the memory into a working memory. This operation can cause to be instantiated a frontend application associated with the third party service 150 which, in turn includes one or more trip data services—the trip booking service 152, the airline clearinghouse service 154, and the trip broker service 156—that are leveraged to instantiate a backend application instance of the third party service 150.

For example, the frontend application instance on the client device 120 may submit a request to access a feature of the third party service 150 that is provided to the third party service as a component as a service by the host service 110. The request may include, as noted above, an authorization token associated with a user of the third-party service 150. Upon receiving the request, the backend instance of the third party service 150 (instantiated by the trip data services 152, 154, 156) forwards the request to the host service 110.

These foregoing embodiments depicted in FIG. 1 and the various alternatives thereof and variations thereto are presented, generally, for purposes of explanation, and to facilitate an understanding of various configurations and constructions of a trip-planning system, such as described herein. However, it will be apparent to one skilled in the art that some of the specific details presented herein may not be required in order to practice a particular described embodiment, or an equivalent thereof.

FIG. 2 depicts an example view of a graphical user interface 200 of a trip coordination service showing query results for a trip. In some embodiments, the graphical user interface 200 may be integrated into a frontend application of a cloud-based software platform (shown in FIG. 3). In other embodiments, the graphical user interface 200 may be displayed as a pop-up window over the frontend application of a software platform, such as a collaborative documentation platform (as shown in FIG. 4), or an issue tracking platform (shown in FIG. 5) etc. In yet other embodiments, the graphical user interface 200 can be a web-enabled plugin that operates within a browser of the client device 120 (shown in FIG. 1).

The graphical user interface 200 includes a main interface panel 201 displaying elements that a user can interact with. The main interface panel 201 displays content in a non-paginated fashion. In some embodiments, the main interface panel 201 may be configured to provide continuous and uniform scrolling of the content in response to user input including, for example, a scroll input from a mouse or trackpad, input provided to a scroll bar element (not shown) positioned along a side of or within the main interface panel 201, or in response to a gesture or other input command.

The graphical user interface 200 may include a header 202 above the main interface panel 201, and a number of control elements (e.g., buttons, sliders, radio buttons, etc.) for virtually controlling graphic user interface 200. The header 202 may include a menu 204 that can direct a user to various applications within the trip coordination service. The header 202 may also include drop-down menus 206

(e.g., Home, Recent, Spaces, People, Apps, etc.) from which elements can be selected by a user to various interfaces within the current application of the trip coordination service. The header 202 may include a "Create" control element 205 to help create new queries to the third party service 150. The header 202 may include a "Search" control element 208 to search data related to users and trips. The header 202 may also include a profile control element 207 that links to user profile information associated with the particular user accessing the graphical user interface 200.

The main interface panel 201 includes content such as a title 210 and a general description 202 of the trip coordination service. As shown in FIG. 2, the example graphical user interface 200 includes a user information box 214 having a list of team members designated for a trip, and a trip information box 216 indicating trip preferences such as, but not limited to, trip dates, etc. A trip-planning control element 218 is located adjacent to the trip information box 216. Upon entry of data into the user information box 214 and the trip information box 216, the trip-planning control element 218 can be pressed. This generates API calls to the third party service 150 to find trip possibilities for the team members.

It should be noted that the graphical user interface 200 is not a standalone interface, but is driven by the data analysis engine 134 of the trip coordination service 130 (FIG. 1). The data analysis engine 134 may receive data related to the interaction events of users from the interaction event log 115 of the host service 110. The data may relate to user activity on the respective cloud-based software platform (e.g., ITS platform 114, collaborative documentation platform 116, etc.) integrated with the trip coordination service 130. This data is monitored and analyzed to detect and identify relationships among users (e.g., using a dependency graph discussed above) and forwarded to the graphical user interface 200, in response to a determination of need for an in-person meeting based on a level of user activity.

Thus the user information box 214 and the trip information box 216 may be automatically filled in by the trip coordination service 130 integrated with the software platform and additionally/alternatively subject to feedback or confirmation from individual users. As a non-limiting example, the trip coordination service may make API calls to obtain names, locations, and preferred trip dates associated with multiple users forming a team and fill in the user information box 214 and the trip information box 216 accordingly.

The trip possibilities 220 (e.g., Chicago, Atlanta, San Diego, etc.) are presented as a ranked list of candidate trip locations, as described herein, near the bottom of the main interface panel 201. Each of the trip possibilities 220 include a "Book" control element 221. Once a trip possibility 220 is booked, either by an individual user or an automated recommendation, by pressing the "Book" control element 221, an "OK" control element 222, an "UNDO" control element 223, and a "CHANGE" control element 224 are generated adjacent to a notification of booking of the trip. Subsequently, a pop-up window 225 also appears over the main interface panel 201 that indicates that a trip has been booked for an in-person meeting of the team members.

Figure 3:
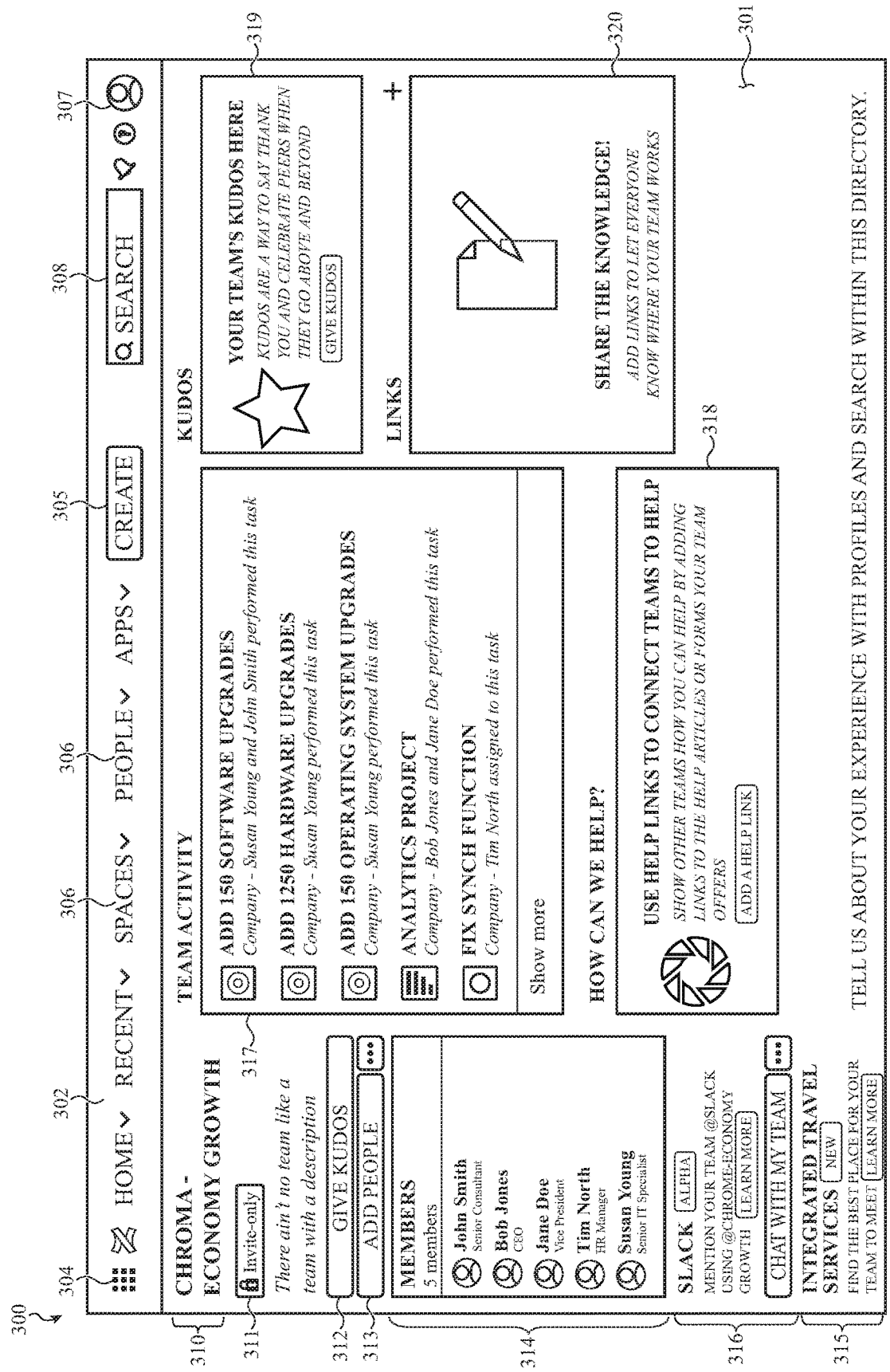
FIG. 3 depicts an example view of a frontend application of a software platform incorporating a link to a trip coordination service, according to certain aspects of the present disclosure.
Figure 4:
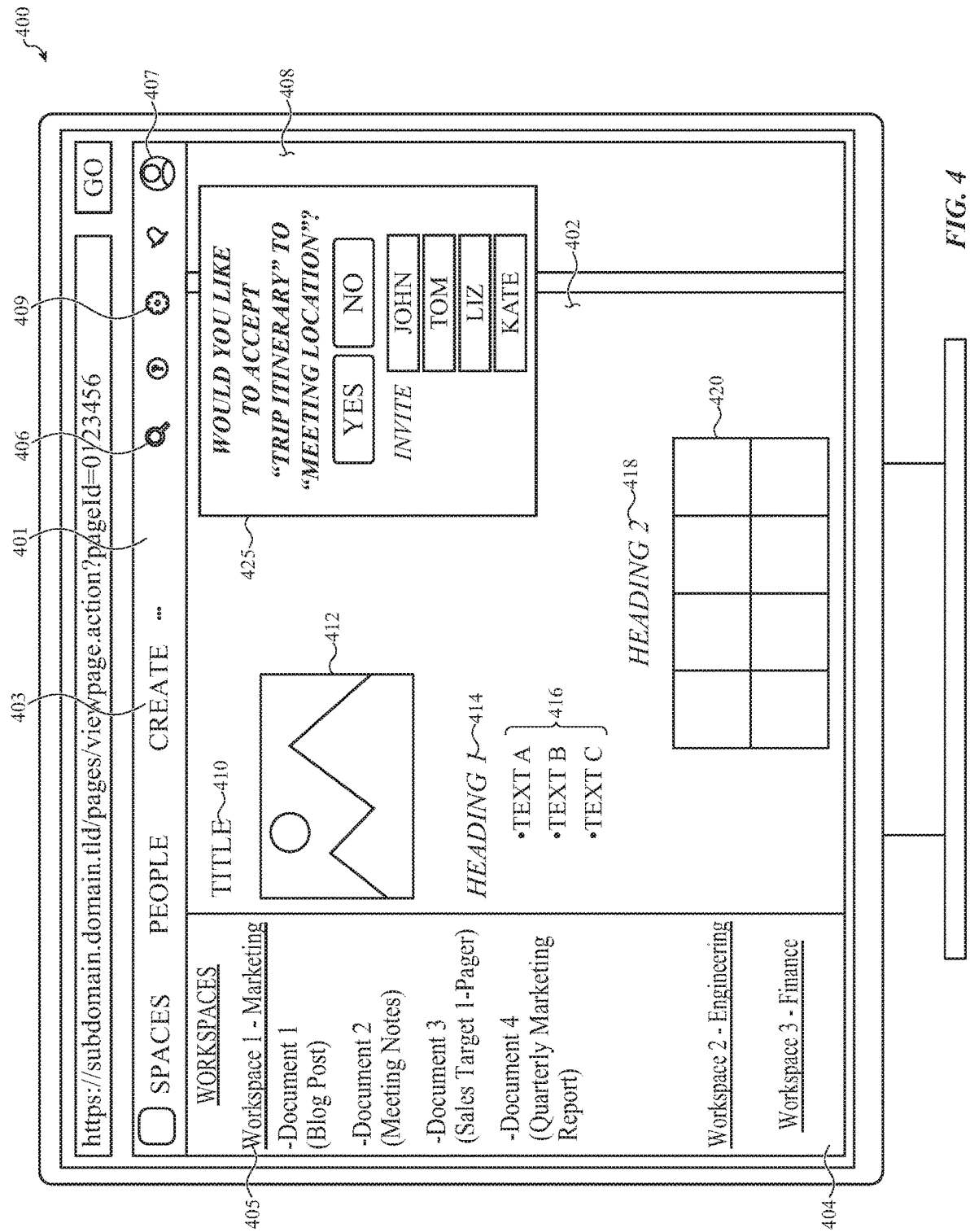
FIG. 4 depicts an example view of a frontend application of a collaborative documentation platform with a pop-up window generated by the trip coordination service, according to certain aspects of the present disclosure.

FIG. 3 depicts an example view of a frontend application of a software platform incorporating a link to a trip coordination service, as described herein. The example view pertains to a home page of a content collaboration platform (e.g., the collaborative documentation platform shown in FIG. 4). The frontend application includes a graphical user interface 300. The graphical user interface 300 includes a main interface panel 301, and a header 302 having a menu 304, drop-down menus 306, a "Create" control element 305, a "Search" control element 308, and a profile control element 307. The "Create" control element 305 may be used to help create new documents, projects, issues, or tasks within the content collaboration platform. The "Search" control element 308 may be used to search existing databases for data related to existing documents, projects, issues, tasks, and users. The profile control element 307 links to user profile information associated with the particular user accessing the graphical user interface 300.

The main interface panel 301 includes a title 310, an invitation control element 311, and a team member information box 314 that lists team members working on a project on the software platform. Team members working on the project can be given kudos by pressing the "Give Kudos" control element 312. Team members can be added to the project by pressing the "Add People" control element 313.

The main interface panel 301 incorporates links to a messaging tool 316 (e.g., Slack) and the trip coordination service link 315, as described herein. The link to the messaging tool 316 redirects to an interface which enables the team members to communicate among themselves. The trip coordination service link 315 redirects to the graphical user interface 200, shown in FIG. 2, to enable the team members to plan a trip for an in-person meeting. In some embodiments, the trip coordination service link 315 may automatically generate recommendations for trip possibilities based on interaction events on the software platform, without any user input, as described above.

The main interface panel 301 includes a team activity panel 317 which documents interaction events and assignments among the different team members on the project. The main interface panel 301 includes a helpdesk link 318 which enables the team members to seek technical help while working on the software platform. The main interface panel 301 may also include a portion 319 displaying kudos received by the team, and a roster of links 320 to share information and knowledge about the team members.

Various interactions on the graphical user interface 300 by users using the features described above may be recorded as interaction events in the interaction event log 115 (FIG. 1) for subsequent determination of relationships among users of the software platform and further analysis. Some of interaction events may be direct such as, but not limited to, (i) communicating through the messaging tool 316, (ii) giving kudos to team members through the "Give Kudos" control element 312, (iii) adding team members through the "Add People" control element 313, etc. Other interaction events may be indirect such as, but not limited to, (i) creating a document, project, or issue through the "Create" control element 305 that is subsequently accessed by another user, (ii) searching for a document, project, or issue through the "Search" control element 308 that is accessible by another user, (iii) assigning a project or providing editing access to a document to another user as recorded on the team activity panel 317, (iv) seeking same or substantially similar technical help as another user through the helpdesk link 318.

The recorded interaction events may be accessed and analyzed by the data analysis engine 134 (FIG. 1) to determine quality and quantity of activity among users and identify their interrelationships. As a non-limiting example, an aggregate activity among users may be determined as a weighted sum of direct interaction events and indirect interaction events, where a relatively higher weight is assigned to direct interaction events. Different weights may be assigned even within different types of direct interaction events and indirect interaction events. Accordingly, the aggregate activity thus determined is more informed with qualitative nature of the interactions between multiple users. This aggregate activity is measured against activity criteria such as, but not limited to, a current project status, a historical level of interaction among the users, a demonstrable need for an in-person interaction inferred from the interaction events, calendar availability associated with the users, etc.

Once the data analysis engine 134 identifies relationships among users in the software platform, aggregate activity among them, and whether an in-person meeting is needed, such information is forwarded to the trip coordination service 130 integrated with the software platform. The trip coordination service 130 can then initiate a trip-planning operation. Accordingly, the trip coordination service link 315 may automatically generate recommendations for trip possibilities, with or without further user input.

FIG. 4 depicts an example view of a frontend application of a collaborative documentation platform with a pop-up window generated by the trip coordination service. FIG. 4 shows a graphical user interface 400 of a document on the collaborative documentation platform, which is being displayed by a web browser client application instantiated on a client device (e.g., the client device 120 of FIG. 1). The graphical user interface 400 includes a content panel 402 and a header 401 above the content panel 402. The header 401 may display controls and user interface elements associated with the browser control (e.g., browsing tabs, and elements for printing, bookmarking content, sharing content, or providing quick access to bookmarked content). The header 401 includes a "Create" control element 403 to help create new collaborative documents, a "Search" control element 406 to search for data on users and documents on the collaborative documentation platform, a "Settings" control element 409 to adjust user settings of the graphical user interface 400, and a profile control element 407 that links to user profile information associated with the particular user accessing the graphical user interface 400.

The graphical user interface 400 may include a content tree panel 404, which includes a content tree 405 of selectable elements that correspond to a page, document, or other electronic content having a nested or parent-child hierarchical relationship to the content displayed in the content panel 402. The graphical user interface 400 may also include a comments panel 408 having narratives for in-line comments embedded in the content displayed in the content panel 402, notes associated with the content, version or content history, or other auxiliary content related to or supplemental to the content depicted in the content panel 402. The content panel 402 further includes content that is displayed in response to a request to view the respective page or document, such as a title 410, a multimedia object (image, graphic, video, or audio) 412, one or more headings 414, 418, body text 416, and other content 420 (in this case, a table of elements or content). The content of the page or document may be tagged or marked in accordance with a particular document protocol such as, but not limited to, an Atlassian Document Format (ADF), Hyper Text Markup Language (HTML), Extensible Markup Language (XML) or other document format.

The data analysis engine 134 (FIG. 1) of the trip coordination service 130 operates a backend application to analyze various direct and indirect interaction events recorded for multiple users, determine quality and quantity of interaction activity among the users, as discussed above. As non-limited examples, the interaction events may be activity on commonly-shared and/or commonly-accessed content on the collaborative documentation platform, relevant comments provided by the users on the comments panel 408, editing activities on the collaborative documentation platform, etc. This data helps identify interrelationships among different users (e.g., using a dependency graph) and informs whether an in-person meeting is needed, which in turn triggers the frontend service 132 to generate automated recommendations for trips to individual users on the graphical user interface 400, with or without further user input.

The graphical user interface 400, as shown, may have an instance of a pop-up window 425 generated by the trip coordination service 130. The pop-up window 425 may present a user with trip possibilities for an in-person meeting, seek input from the user regarding the trip, and/or present a notification that a trip has been booked. In the example view shown in FIG. 4, the pop-up window 425 asks the user "Would you like to accept 'Trip Itinerary' to 'Meeting Location'?", to which the user may respond by clicking on a 'Yes' or 'No' control element. The pop-up window 425 may also present the user with the ability to invite one or more team members—John, Tom, Liz, and Kate—by clicking on respectively-named control elements. The information on the pop-up window 425 may also be accessed by the user upon visiting the graphical user interface 200 of the trip coordination service, as shown in FIG. 2.

FIG. 5 depicts an example view of a frontend application of an issue tracking platform with a pop-up window generated by the trip coordination service. FIG. 5 shows a graphical user interface 500 of a project on the issue tracking platform, which is being displayed by a web browser client application instantiated on a client device (e.g., the client device 120 of FIG. 1). The issue tracking platform is used to create issues and/or tickets, which are then tracked according to a programmed or predetermined set of states or workflow.

The graphical user interface 500 includes a main interface panel 501 displaying elements that a user can interact with, and a header 502 above the main interface panel 501. The header 502 may include a menu 504 that can direct a user to various applications within the issue tracking platform. The header 502 may also include drop-down menus 506 (e.g., Projects, Filters, Dashboards, People, Plans, Apps, etc.) from which elements can be selected by a user to various interfaces within the current frontend application of the issue tracking platform. The header 502 may include a "Create" control element 505 to help create new issues to track, a "Search" control element 508 to search data related to users and issues being tracked, and a profile control element 507 that links to user profile information associated with the particular user accessing the graphical user interface 500.

The graphical user interface 500 includes a panel 510 for a project that lists selectable elements 515 denoting issues and filters being tracked on the issue tracking platform. The selectable elements 515, when selected, display a detailed panel 520 showing a roster of issues 522 listed as being tracked under the selected one of the selectable elements 515.

The data analysis engine 134 (FIG. 1) of the trip coordination service 130 operates a backend application to analyze various direct and indirect interaction events recorded for multiple users, determine quality and quantity of interaction activity among the users, as discussed above. As non-limited examples, the interaction events may be activity on commonly-tracked and/or commonly-accessed issues on the issue tracking platform, editing activities on the issue tracking platform, etc. This data helps identify interrelationships among different users (e.g., using a dependency graph) and informs whether an in-person meeting is needed, which in turn triggers the frontend service 132 to generate automated recommendations for trips to individual users on the graphical user interface 500, with or without further user input.

The graphical user interface 500, as shown, may have an instance of a pop-up window 525 generated by the trip coordination service. The pop-up window 525 may present a user with trip possibilities for an in-person meeting, seek input from the user regarding the trip, and/or present a notification that a trip has been booked. In the example view shown in FIG. 5, the pop-up window 525 asks the user "Would you like to accept 'Trip Itinerary' to 'Meeting Location'?", to which the user may respond by clicking on a 'Yes' or 'No' control element. The information on the pop-up window 525 may also be accessed by the user upon visiting the graphical user interface 200 of the trip coordination service, as shown in FIG. 2.

Figure 6:
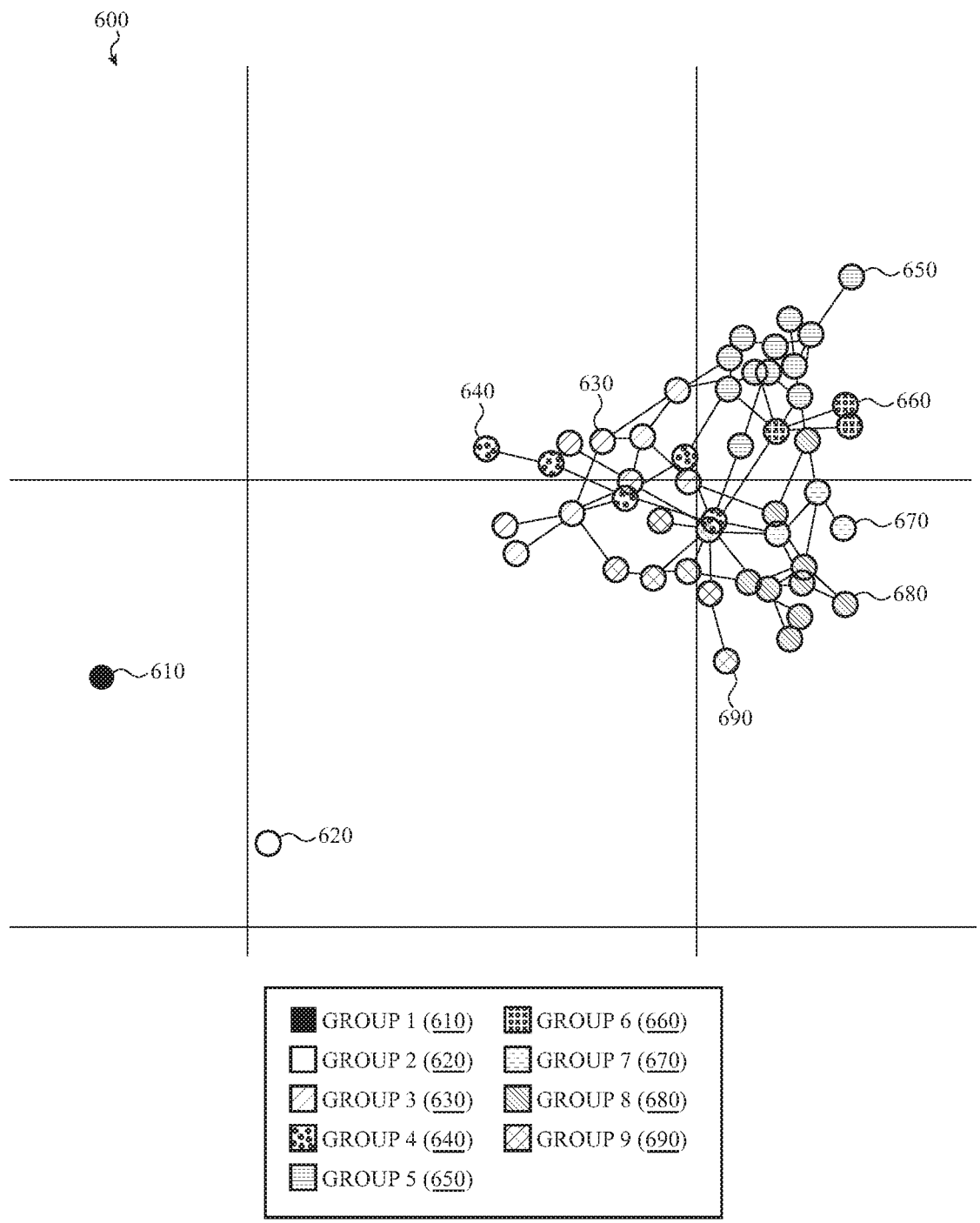
FIG. 6 shows an example dependency graph used by the trip coordination service, according to certain aspects of the present disclosure.

FIG. 6 shows an example dependency graph 600 used by the trip coordination service. While the embodiments described herein discuss the implementation of a dependency graph 600 as a tool for detecting relationships between users of a software platform, it should be understood that any similar tools for relationship detection can be used and falls within the scope of this disclosure. Other techniques for storing and detecting pertinent information associated with multiple users may be implemented through use of statistical tools like correlation measures among data objects, as well as data registries, databases, modifications to existing data objects associated with user accounts.

The dependency graph 600 helps identify communities or groups of users working together within an organization, and measure a level of connectedness of users within the group based on a proportion of users who are collaborating, e.g., participating on interaction events related to a project. This data can help filter their interaction events for further analysis on activity levels within the identified group. The dependency graph 600 can also help identify influencers within the identified groups by analyzing the interaction events to find users who amplify the flow of information within the identified groups. Various well-known curve-fitting and machine-learning algorithms can be used for these purposes to extract relevant data from the interaction events.

The dependency graph 600 is formed from data related to activity of different users on the software platform. As a non-limiting example, the dependency graph 600 may be defined based on common permissions assigned to the three or more user accounts for managing content on the cloud-based software platform. The different nodes on the dependency graph 600 correspond to user accounts belonging to different users. The activity of different users are collected as interaction events recorded on the software platform for subsequent monitoring and analysis. The interaction events may include opening, viewing, editing, closing, removing, messaging and/or drafting activity associated with a project on a cloud-based software platform such as, the collaborative documentation platform described with respect to FIG. 4 and the issue tracking platform described with respect to FIG. 5 above.

The quality and quantity of activity among users help determine a degree of connectedness among different nodes representing the different users. As discussed above, in some embodiments, an aggregate activity among users may be determined as a weighted sum of direct interaction events and indirect interaction events, where a relatively higher weight is assigned to direct interaction events than indirect interaction events. The strength of the aggregate activity between any two users helps establish an edge connecting the corresponding nodes. As activity levels are monitored over time, the dependency graph 600 is formed by a universe of nodes connected by edges. Further analysis of this universe of nodes reveals clusters of nodes that form stronger connections than others, and these connections become progressively stronger over time. Accordingly, this indicates groups of users that collaborate with each other more than others, which help identify interrelationships among the different users in the dependency graph 600. In some embodiments, the dependency graph 600 can be further modified based on further feedback and validation from individual users regarding the interrelationships.

In the example dependency graph 600 shown in FIG. 6, the data from interaction events for each user on a software platform are plotted to visually determine a scatter of the data. Each circle on the dependency graph 600 is a user and an edge between them indicates that they worked on the same issue or document. Any two users can be thus demonstrably linked by an edge based on received data on interaction events, when they worked on the same document or issue related to a project on the software platform. The various shadings of the groups 610, 620, 630, 640, 650, 660, 670, 680, and 690 identify the groups of users who work together.

Figure 7:
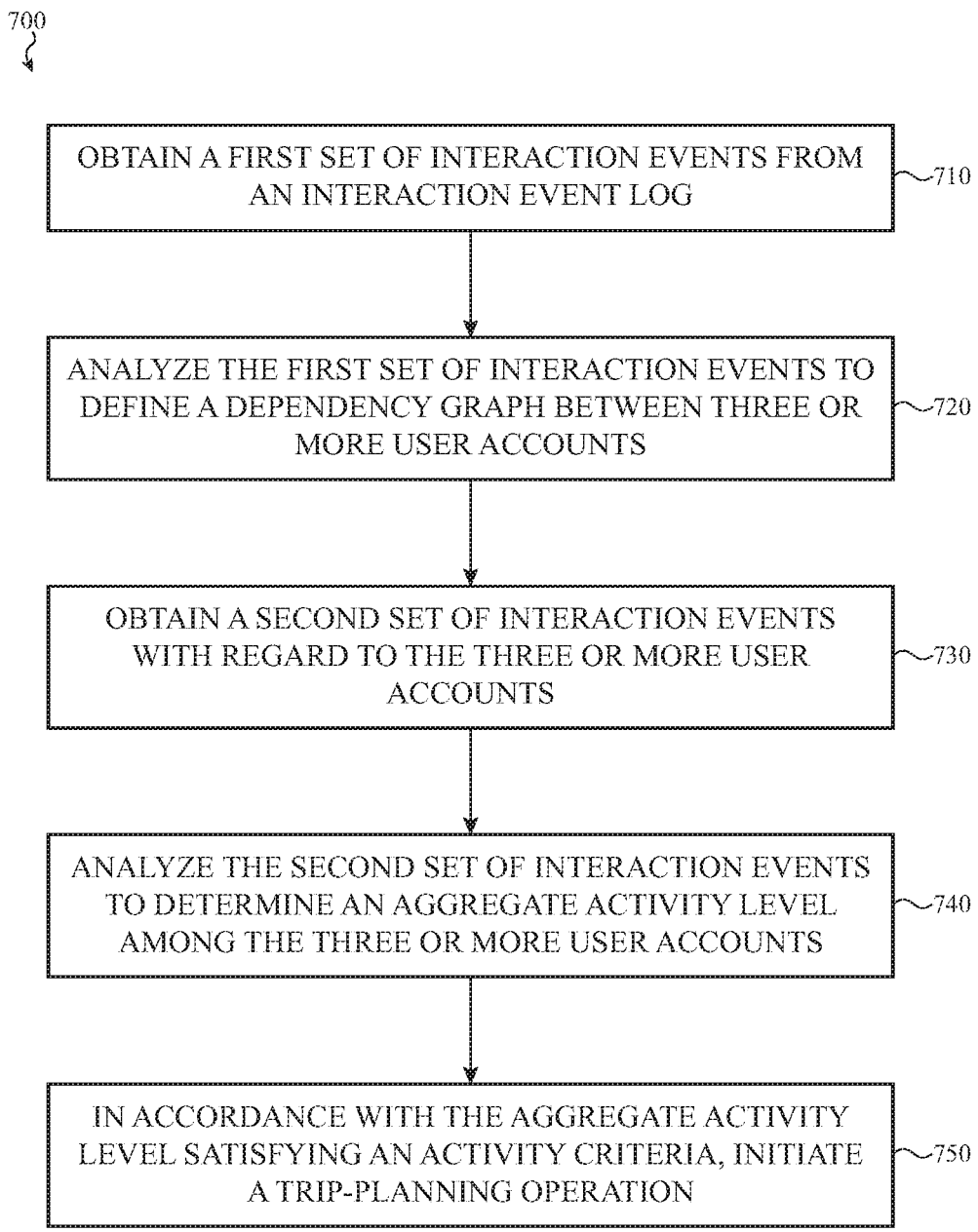
FIG. 7 shows a block diagram of a method of using a trip coordination service integrated within a cloud-based software platform for planning a cost-efficient trip for users of the cloud-based software platform, according to certain aspects of the present disclosure.

FIG. 7 shows a block diagram 700 of an example method for planning a cost-efficient trip for users of a cloud-based software platform. The method starts in block 710, where a first set of interaction events are obtained by a trip coordination service (e.g., the trip coordination service 130 in FIG. 1) from an interaction event log (e.g. the interaction event log 115 in FIG. 1) in the cloud-based software platform. In some embodiments, the trip coordination service may make API calls to the cloud-based software platform in order to obtain names, locations, and preferred trip dates associated with multiple users forming a team. In some embodiments, the interaction event log pertains to a content collaboration platform such as, but not limited to, an issue tracking platform, a collaborative documentation platform, etc. The issue tracking platform is configured to track a plurality of issues according to an automated project workflow and each issue of at least a portion of the plurality of issues identifies at least one user account. The collaborative documentation platform is configured to monitor a document related to a task and each document identifies at least one user account that interacts with the document. The interaction events may include opening, viewing, editing, closing, removing, messaging and/or drafting activity associated with a project on a cloud-based software platform such as, the collaborative documentation platform described with respect to FIG. 4 and the issue tracking platform described with respect to FIG. 5 above.

In block 720, the first set of interaction events are analyzed by the trip coordination service to define a dependency graph among three or more user accounts. The dependency graph, as shown above in FIG. 6, is a tool for detecting relationships between users of the software platform. The dependency graph helps identify communities or groups of users collaborating together, a level of connectedness of the users within the group, as well as identify influencers within the identified groups. In some non-limiting embodiments, the dependency graph is defined based on common permissions assigned to the three or more user accounts for managing content on the issue tracking platform or the collaborative documentation platform. As mentioned above, in other embodiments, other techniques for storing and detecting pertinent information associated with multiple users may be implemented through use of statistical tools like correlation measures among data objects, as well as data registries, databases, modifications to existing data objects associated with user accounts.

In block 730, a second set of interaction events are obtained with regard to the three or more user accounts that form the dependency graph. The second set of interaction events are related only to the users having relationships identified based on the dependency graph, and include activity data captured over time that may or may not be the same as the time over which the first set of interaction events are captured. The second set of interaction events may or may not overlap with the first set of interaction events.

In block 740, the second set of interaction events are analyzed to determine an aggregate activity level among the three or more user accounts. When the content collaboration platform is an issue tracking platform, the second set of interaction events may be analyzed with respect to a first set of issues associated with the dependency graph. When the content collaboration platform is a collaborative documentation platform, the second set of interaction events may be analyzed with respect to a monitored document associated with the dependency graph. As discussed above with respect to FIG. 3, an aggregate activity level is a measure of the quality and quantity of activity among users, and may be determined as a weighted sum of direct interaction events and indirect interaction events.

In block 750, a trip-planning operation is initiated based on the aggregate activity level satisfying an activity criteria. The trip-planning operation has a number of automated or semi-automated steps that lead to trip recommendations for an in-person meeting among users associated with the user accounts. In some embodiments, some of the steps may need further input and/or confirmation from individual users in order to complete. In some embodiments, the activity criteria may be associated with a current project status, a historical level of interaction among the three or more user accounts, a demonstrable need for interaction among the three or more user accounts, and/or a calendar availability associated with the three or more user accounts. In other embodiments, the activity criteria may be user-defined and customized before the data is analyzed.

Figure 8:
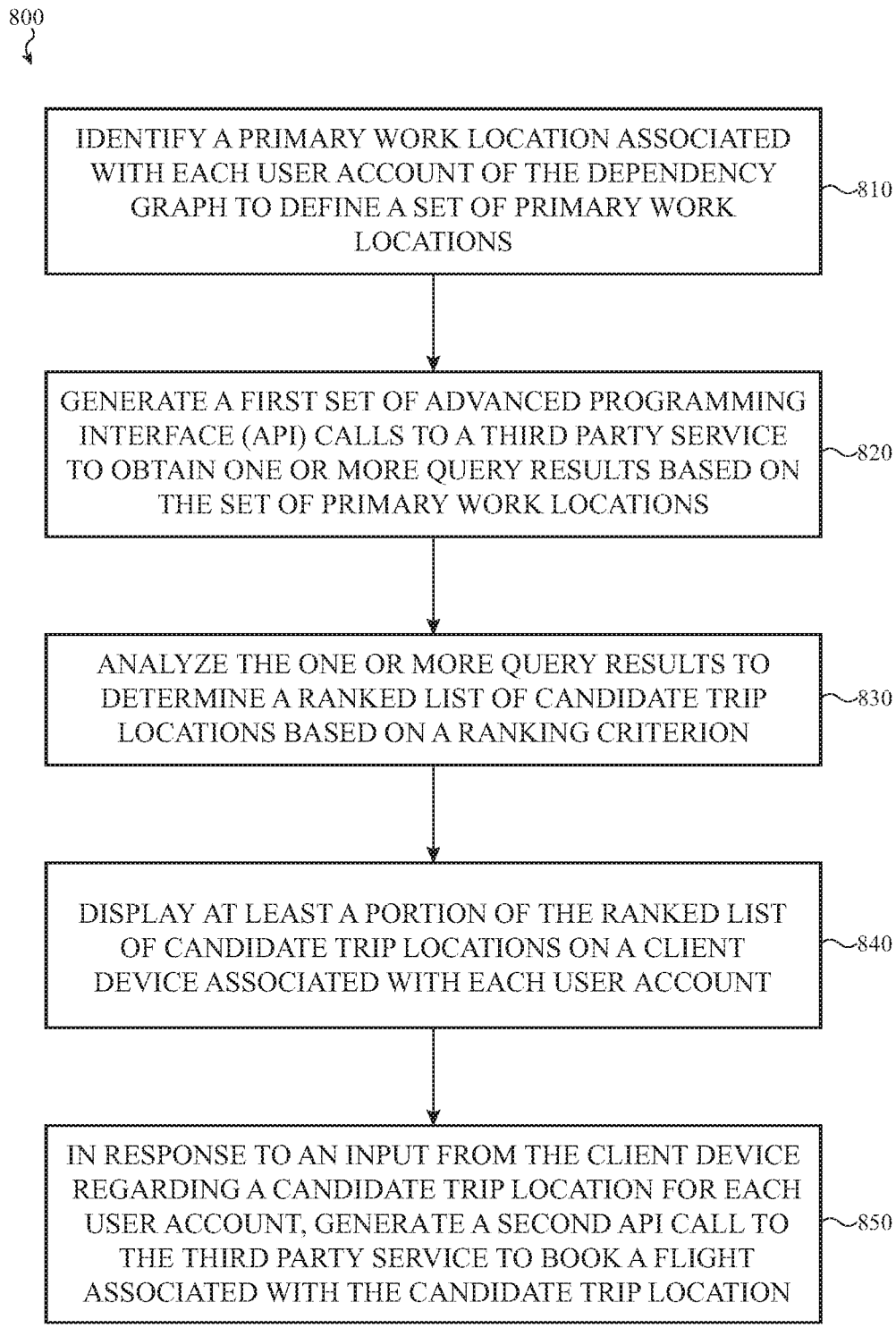
FIG. 8 shows a block diagram of a trip-planning operation initiated by the method of FIG. 7, according to certain aspects of the present disclosure.

FIG. 8 shows a block diagram 800 of an example trip-planning operation initiated by the method of FIG. 7. The example trip-planning operation may be performed by the trip coordination service 130 described with respect to FIG. 1. In block 810, a primary work location associated with each user account of the dependency graph is identified to define a set of primary work locations. In some non-limiting embodiments, the primary work location associated with each user may be obtained from user profiles associated with each user or a directory stored in the cloud-based software platform. In other embodiments, an address of the user may substitute for the primary work location.

In block 820, a first set of API calls are generated to a third party service (e.g., the third party service 150 in FIG. 1) to obtain one or more query results based on the set of primary work locations. In some embodiments, an indication regarding preferred trip dates for the trip may be received from each user account, prior to generating the first set of API calls. In some embodiments, the query results may include trip possibilities discussed above such as, but not limited to, flight itineraries, train itineraries, vehicle itineraries, ship itineraries, hotel reservations, workspace reservations, and/or meal reservations.

In block 830, the one or more query results are analyzed to determine a ranked list of candidate trip locations based on a ranking criterion. The candidate trip location may be a location for organizing an in-person meeting among the users. In some embodiments, the ranking criterion is associated with minimizing cost of the trip, minimizing cost of a component of the trip such as flight or hotel reservations, minimizing time of the trip, minimizing a number of layovers of the trip, minimizing layover time of the trip, and/or maximizing time at the candidate trip location. In other embodiments, the ranking criterion may be user-defined before the data is analyzed. In some embodiments, at least a portion of the ranked list of candidate trip locations us generated by a recommendation service (e.g. the recommendation service 136 shown in FIG. 1) based on historical trip results associated with each user account of the dependency graph, and/or trip preferences associated with each user account.

In block 840, at least a portion of the ranked list of candidate trip locations are displayed on a client device (e.g., the client device 120 in FIG. 1). The ranked list may be displayed on the graphical user interface 200 of the trip coordination service 130, as described with respect to FIG. 2. In some embodiments, the ranked list may also be displayed in the pop-up window 425 over the graphical user interface 400 of a collaborative documentation platform (shown in FIG. 4), or the pop-up window 525 over the graphical user interface 500 of an issue tracking platform (shown in FIG. 5).

In block 850, in response to an input from the client device regarding a candidate trip location for each user account, a second API call is generated to the third party service (e.g., the third party service 150 in FIG. 1) to book a trip associated with the candidate trip location. In some embodiments, the notification confirming the trip is received and in response to the notification, an aggregate activity level (described above) for the dependency graph (e.g. the dependency graph 600 shown in FIG. 6) is reset. In some embodiments, in response to an input from the client device, a consensus regarding the candidate trip locations may be determined, prior to generating the second API call.

Figure 9:
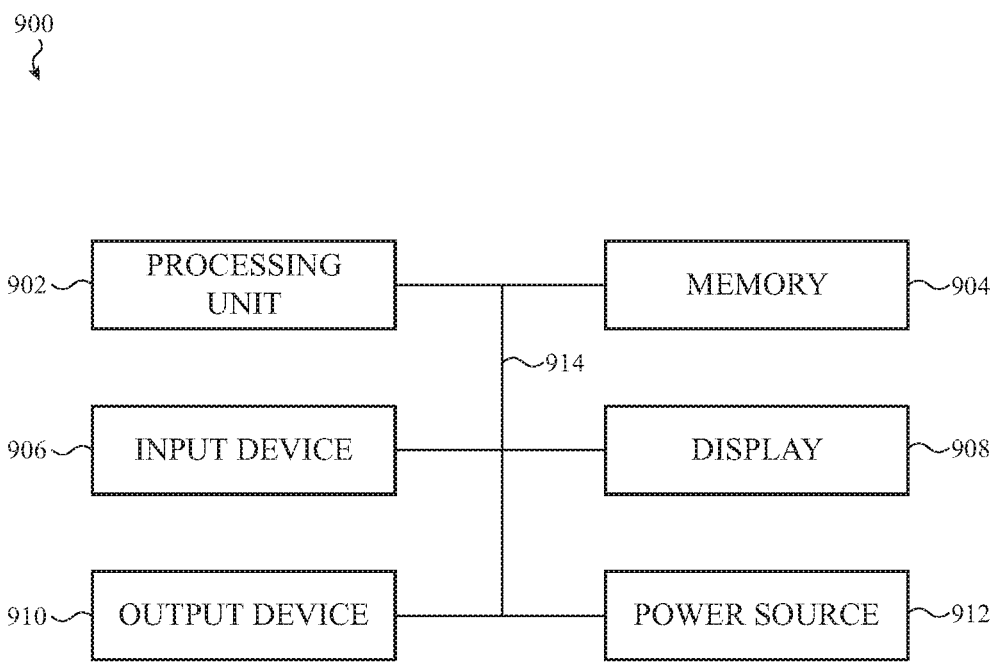
FIG. 9 depicts an example hardware of an electronic device that may implement the trip-planning system described herein, according to certain aspects of the present disclosure.

FIG. 9 depicts an example electrical hardware of an electronic device 900 that may implement the trip-planning system 100. The electronic device 900 may in some cases take the form of any of the electronic devices described with reference to FIGS. 1-4D, including client devices, and/or servers or other computing devices associated with the trip-planning system 100. The electronic device 900 can include one or more of a processing unit 902, a memory 904 or storage device, input devices 906, a display 908, output devices 910, and a power source 912. In some cases, various implementations of the electronic device 900 may lack some or all of these components and/or include additional or alternative components.

The processing unit 902 can control some or all of the operations of the electronic device 900. The processing unit 902 can communicate, either directly or indirectly, with some or all of the components of the electronic device 900. For example, a system bus or other communication mechanism 914 can provide communication between the processing unit 902, the power source 912, the memory 904, the input device(s) 906, and the output device(s) 910.

The processing unit 902 can be implemented as any electronic device capable of processing, receiving, or transmitting data or instructions. For example, the processing unit 902 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 900 can be controlled by multiple processing units. For example, select components of the electronic device 900 (e.g., an input device 906) may be controlled by a first processing unit and other components of the electronic device 900 (e.g., the display 908) may be controlled by a second processing unit, where the first and second processing units may or may not be in communication with each other The power source 912 can be implemented with any device capable of providing energy to the electronic device 900. For example, the power source 912 may be one or more batteries or rechargeable batteries. Additionally or alternatively, the power source 912 can be a power connector or power cord that connects the electronic device 900 to another power source, such as a wall outlet.

The memory 904 can store electronic data that can be used by the electronic device 900. For example, the memory 904 can store electronic data or content such as, for example, audio and video files, documents and applications, device settings and user preferences, timing signals, control signals, and data structures or databases. The memory 904 can be configured as any type of memory. By way of example only, the memory 904 can be implemented as random access memory, read-only memory, Flash memory, removable memory, other types of storage elements, or combinations of such devices.

In various embodiments, the display 908 provides a graphical output, for example associated with an operating system, user interface, and/or applications of the electronic device 900 (e.g., a chat user interface, an issue tracking user interface, an issue-discovery user interface, etc.). In one embodiment, the display 908 includes one or more sensors and is configured as a touch-sensitive (e.g., single-touch, multi-touch) and/or force-sensitive display to receive inputs from a user. For example, the display 908 may be integrated with a touch sensor (e.g., a capacitive touch sensor) and/or a force sensor to provide a touch- and/or force-sensitive display. The display 908 is operably coupled to the processing unit 902 of the electronic device 900.

The display 908 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 908 is positioned beneath and viewable through a cover that forms at least a portion of an enclosure of the electronic device 900.

In various embodiments, the input devices 906 may include any suitable components for detecting inputs. Examples of input devices 906 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, control elements, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 906 may be configured to detect one or more particular types of input and provide a signal (e.g., an input signal) corresponding to the detected input. The signal may be provided, for example, to the processing unit 902.

As discussed above, in some cases, the input device(s) 906 include a touch sensor (e.g., a capacitive touch sensor) integrated with the display 908 to provide a touch-sensitive display. Similarly, in some cases, the input device(s) 906 include a force sensor (e.g., a capacitive force sensor) integrated with the display 908 to provide a force-sensitive display.

The output devices 910 may include any suitable components for providing outputs. Examples of output devices 910 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 910 may be configured to receive one or more signals (e.g., an output signal provided by the processing unit 902) and provide an output corresponding to the signal.

In some cases, input devices 906 and output devices 910 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 902 may be operably coupled to the input devices 906 and the output devices 910. The processing unit 902 may be adapted to exchange signals with the input devices 906 and the output devices 910. For example, the processing unit 902 may receive an input signal from an input device 906 that corresponds to an input detected by the input device 906. The processing unit 902 may interpret the received input signal to determine whether to provide and/or change one or more outputs in response to the input signal. The processing unit 902 may then send an output signal to one or more of the output devices 910, to provide and/or change outputs as appropriate.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

As described above, one aspect of the present technology may be the gathering and use of data available from various sources, including biometric data. The present disclosure contemplates that, in some instances, this gathered data may include personal data that uniquely identifies or can be used to identify, locate, or contact a specific person. Such personal data can include, for example, biometric data and data linked thereto (e.g., demographic data, location-based data, telephone numbers, email addresses, home addresses, data or records relating to a user's health or level of fitness (e.g., vital signs measurements, medication information, exercise information), date of birth, or any other identifying or personal data).

The present disclosure recognizes that the use of such personal data, in the present technology, can be used to the benefit of users. For example, the personal data can be used to authenticate a user to access their device, or gather performance metrics for the user's interaction with an augmented or virtual world. Further, other uses for personal data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal data will comply with well-established privacy policies and/or privacy practices. In particular, such entities should implement and consistently use privacy policies and practices that are generally recognized as meeting or exceeding industry or governmental requirements for maintaining personal data private and secure. Such policies should be easily accessible by users, and should be updated as the collection and/or use of data changes. Personal data from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal data and ensuring that others with access to the personal data adhere to their privacy policies and procedures. Further, such entities can subject themselves to evaluation by third parties to certify their adherence to widely accepted privacy policies and practices. In addition, policies and practices should be adapted for the particular types of personal data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal data. That is, the present disclosure contemplates that hardware and/or software elements can be provided to prevent or block access to such personal data. For example, in the case of advertisement delivery services, the present technology can be configured to allow users to select to "opt in" or "opt out" of participation in the collection of personal data during registration for services or anytime thereafter. In another example, users can select not to provide data to targeted content delivery services. In yet another example, users can select to limit the length of time data is maintained or entirely prohibit the development of a baseline profile for the user. In addition to providing "opt in" and "opt out" options, the present disclosure contemplates providing notifications relating to the access or use of personal data. For instance, a user may be notified upon downloading an app that their personal data will be accessed and then reminded again just before personal data is accessed by the app.

Moreover, it is the intent of the present disclosure that personal data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal data to implement one or more various disclosed embodiments, the present disclosure also contemplates that the various embodiments can also be implemented without the need for accessing such personal data. That is, the various embodiments of the present technology are not rendered inoperable due to the lack of all or a portion of such personal data. For example, content can be selected and delivered to users by inferring preferences based on non-personal data or a bare minimum amount of personal data, such as the content being requested by the device associated with a user, other non-personal data available to the content delivery services, or publicly available information.

Furthermore the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computer-implemented method comprising:
   obtaining a first set of interaction events from an interaction event log of an issue tracking platform configured to track a plurality of issues according to an automated project workflow, wherein each issue of at least a portion of the plurality of issues identifies at least one user account;
   analyzing the first set of interaction events to define a dependency graph among three or more user accounts;
   obtaining a second set of interaction events with regard to the three or more user accounts;
   analyzing the second set of interaction events with respect to a first set of issues associated with the dependency graph to determine an aggregate activity level among the three or more user accounts;
   in accordance with the aggregate activity level satisfying an activity criteria, initiating a trip-planning operation comprising:
      identifying a primary work location associated with each user account of the dependency graph to define a set of primary work locations;
      generating a first set of advanced programming interface (API) calls to a third party service to obtain one or more query results based on the set of primary work locations;
      analyzing the one or more query results to determine a ranked list of candidate trip locations based on a ranking criterion;
      causing display of at least a portion of the ranked list of candidate trip locations on a client device associated with each user account; and
      in response to an input from the client device regarding a candidate trip location for each user account, causing a second API call to the third party service to book a flight associated with the candidate trip location.

2. The method of claim 1, further comprising:
   receiving a notification confirming the flight; and
   in response to the notification, resetting the aggregate activity level for the dependency graph.

3. The method of claim 1, wherein the ranking criterion is associated with (i) minimizing cost of the flight, (ii) minimizing time of the flight, (iii) minimizing a number of layovers of the flight, (iv) minimizing layover time of the flight, (v) maximizing time at the candidate trip location, or (vi) any combination thereof.

4. The method of claim 1, wherein the activity criteria is associated with (i) a current project status, (ii) a historical level of interaction among the three or more user accounts, (iii) a demonstrable need for interaction among the three or more user accounts, (iv) a calendar availability associated with the three or more user accounts, or (v) any combination thereof.

5. The method of claim 1, wherein the at least a portion of the ranked list of candidate trip locations is generated by a recommendation service based on (i) historical trip results associated with each user account of the dependency graph, (ii) flight preferences associated with each user account, or (iii) both.

6. A trip-planning system comprising:
   a client device executing an instance of an application associated with a user account on a cloud-based software platform; and
   a trip coordination service communicably coupled to the client device over a network, the trip coordination service comprising a processor configured to initiate a trip-planning operation in response to an aggregate activity level of three or more user accounts satisfying an activity criteria on the application, the trip-planning operation comprising:
      identifying a primary work location associated with each user account of a dependency graph, the dependency graph defined by the three or more users performing a one or more interaction events on the application monitored from among a plurality of interaction events obtained from an interaction event log of the cloud-based software platform;
      generating a first set of advanced programming interface (API) calls to a third party service to obtain one or more query results based on the primary work location for each user account;
      analyzing the one or more query results to determine a ranked list of candidate trip locations based on a ranking criterion;
      causing display of at least a portion of the ranked list of candidate trip locations on the client device associated with each user account;
      in response to an input from the client device regarding a candidate trip location for each user account, determining whether a consensus regarding the candidate trip location exists among the three or more user accounts;
      in response to determining that the consensus regarding the candidate trip location exists among the three or more user accounts, generating a second API call to the third party service to book a trip to the candidate trip location for each user account.

7. The trip-planning system of claim 6, wherein the processor is further configured to: receive a notification confirming the trip; and
   in response to the notification, reset the aggregate activity level for the dependency graph.

8. The trip-planning system of claim 6, wherein the one or more query results include flight itineraries, train itineraries, vehicle itineraries, ship itineraries, hotel reservations, workspace reservations, or meal reservations.

9. The trip-planning system of claim 6, wherein the dependency graph is defined based on common permissions assigned to the three or more user accounts for managing content on the cloud-based software platform.

10. The trip-planning system of claim 6, wherein the cloud-based software platform is a collaborative documentation system and the application is configured to monitor documents related to a task.

11. The trip-planning system of claim 6, wherein the cloud-based software platform is an issue tracking system and the application is configured to track issues related to a project.

12. The trip-planning system of claim 6, wherein the ranking criterion is associated with (i) minimizing cost of the trip, (ii) minimizing cost of a component of the trip, (iii) minimizing flight time of the trip, (iv) minimizing a number of layovers of the trip, (v) minimizing layover time of the trip, (vi) maximizing time at the candidate trip location, or (vii) any combination thereof.

13. The trip-planning system of claim 6, wherein the activity criteria is associated with (i) a current status of a task, (ii) a historical level of interaction among the three or more user accounts, (iii) a demonstrable need for interaction among the three or more user accounts, (iv) a calendar availability associated with the three or more user accounts, or (v) any combination thereof.

14. The trip-planning system of claim 6, wherein the at least a portion of the ranked list of candidate trip locations is generated by a recommendation service based on (i) historical trip results associated with each user account of the dependency graph, (ii) trip preferences associated with each user account, or (iii) both.

15. A computer-implemented method comprising:
obtaining a first set of interaction events from an interaction event log of a collaborative documentation platform configured to monitor a plurality of documents, wherein each document identifies at least one user account;
analyzing the first set of interaction events to define a dependency graph among three or more user accounts;
obtaining a second set of interaction events with regard to the three or more user accounts;
analyzing the second set of interaction events with respect to a first set of documents associated with the dependency graph to determine an aggregate activity level among the three or more user accounts;
in accordance with the aggregate activity level satisfying an activity criteria, initiating a trip-planning operation comprising:
identifying a primary work location associated with each user account of the dependency graph to define a set of primary work locations;
generating a first set of advanced programming interface (API) calls to a third party service to obtain one or more query results based on the set of primary work locations;
analyzing the one or more query results to determine a ranked list of candidate trip locations based on a ranking criterion;
causing display of at least a portion of the ranked list of candidate trip locations on a client device associated with each user account; and
in response to an input from the client device regarding a candidate trip location for each user account, generating a second call to the third party service to book a flight to the candidate trip location.

16. The method of claim 15, further comprising:
receive a notification confirming the flight; and
in response to the notification, reset the aggregate activity level for the dependency graph.

17. The method of claim 15, wherein prior to generating the first set of API calls, the trip-planning operation comprises:
receiving an indication from each user account regarding preferred trip dates for the flight.

18. The method of claim 15, wherein the ranking criterion is associated with (i) minimizing cost of the flight, (ii) minimizing time of the flight, (iii) minimizing a number of layovers of the flight, (iv) minimizing layover time of the flight, (v) maximizing time at the candidate trip location, or (vi) any combination thereof.

19. The method of claim 15, wherein the activity criteria is associated with (i) a current project status, (ii) a historical level of interaction among the three or more user accounts, (iii) a demonstrable need for interaction among the three or more user accounts, (iv) a calendar availability associated with the three or more user accounts, or (v) any combination thereof.

20. The method of claim 15, wherein the at least a portion of the ranked list of candidate trip locations is generated by a recommendation service based on (i) historical flight results associated with each user account of the dependency graph, (ii) flight preferences associated with each user account of the dependency graph, or (iii) both.

* * * * *